United States Patent [19]

Bolt

[11] Patent Number: 4,801,377
[45] Date of Patent: Jan. 31, 1989

[54] DEBRIS SEPARATOR UNIT FOR RAINGUTTER DOWNSPOUTS

[76] Inventor: Benjamin H. Bolt, 9 Crescent La., Fairfax, Calif. 94930

[21] Appl. No.: 549,641

[22] Filed: Nov. 7, 1983

Related U.S. Application Data

[63] Continuation-in-part of Ser. No. 325,094, Nov. 25, 1981, abandoned, which is a continuation-in-part of Ser. No. 272,999, Jun. 12, 1981, abandoned.

[51] Int. Cl.⁴ .................... B01D 29/00; E04D 13/08
[52] U.S. Cl. ................................. 210/162; 210/163; 210/248; 210/446; 210/456; 52/12; 52/16
[58] Field of Search .............. 210/162, 163, 248, 446, 210/455, 456; 52/12, 16

[56] References Cited

U.S. PATENT DOCUMENTS

| | | | |
|---|---|---|---|
| 224,699 | 2/1880 | June | 210/456 |
| 477,726 | 6/1892 | Wills | 210/248 |
| 520,993 | 6/1894 | Keller | 210/162 |
| 899,568 | 9/1908 | Shepard | 210/163 |
| 939,838 | 11/1909 | Hensler | 210/162 |
| 1,177,174 | 3/1916 | Doty | 210/456 |
| 1,226,691 | 5/1917 | Nock | 210/248 |
| 2,090,997 | 8/1937 | French | 210/456 |
| 2,210,248 | 8/1940 | Lighthill | 210/162 |
| 2,419,501 | 4/1947 | Pinto | 210/456 |
| 2,494,780 | 1/1950 | Schmidt | 210/162 |
| 3,628,668 | 12/1971 | Huppert | 52/12 |
| 4,247,397 | 1/1981 | Dobosi | 210/162 |

FOREIGN PATENT DOCUMENTS

| | | | |
|---|---|---|---|
| 1911159 | 11/1970 | Fed. Rep. of Germany | 52/12 |
| 601608 | 7/1978 | Switzerland | 52/16 |

Primary Examiner—Ernest G. Therkorn
Attorney, Agent, or Firm—Donald C. Bolger

[57] ABSTRACT

A debris separator is provided in the downspout of a gutter system wherein a steeply angled grating is provided in the downspout which permits water to flow down through the downspout while leaves and other debris are carried downwardly along the grating and out of an opening in the downspout.

2 Claims, 8 Drawing Sheets

DEBRIS SEPARATOR UNIT FOR RAINGUTTER DOWNSPOUTS

REFERENCE TO RELATED APPLICATION

This application is a continuation-in-part of application Ser. No. 325,094, filed 11/25/81, now abandoned, which in turn is a continuation-in-part of application Ser. No. 272,999 filed June 12, 1981, abandoned.

SUMMARY OF THE INVENTION

The present invention relates to a debris separator which is inserted in the downspout of a gutter system so that leaves or other debris which might ordinarily clog the downspout are deflected and pass out through an opening in one wall of the downspout so that the water is permitted to flow through the balance of the downspout without any substantial chance of clogging the downspout.

In accordance with one aspect of the present invention, the grating comprises a plurality of parallel bars which are set at an acute angle to the vertical. By having the bars at an acute angle, preferably less than 30° from vertical, the flow of water is very rapid which gives a good flushing action so that the force of additional debris and the down flowing water combined with the lubricity and carrying capacity of the water cause the leaves and other debris to be swept downward along the bars and out of the system.

In accordance with another aspect of the invention a deflector is provided which is opposite the grating so that water containing debris is deflected into the grating at a high rate of speed.

Another aspect of the invention provides for the angling grating bars to be directed back into the downspout to a substantially vertical position which prevents dripping from the open port and also facilitates the separation of debris from the bars and out of the device.

In accordance with still another aspect of the invention, side walls of the deflector chamber are curved inwardly to deflect water and debris toward the center of the grating, thus preventing leaves and the like from adhering to the walls of the deflection chamber.

Other aspects and advantages of the invention will be brought out in the balance of the specification.

DESCRIPTION OF THE PREFERRED EMBODIMENT

Referring now to that embodiment of the invention shown in FIGS. 1-4, the device of the present invention has an opening which would normally be attached to the bottom of the gutter, said opening being defined by side walls 9 and 11, a front wall 13, and a back wall 15.

Figure 1:
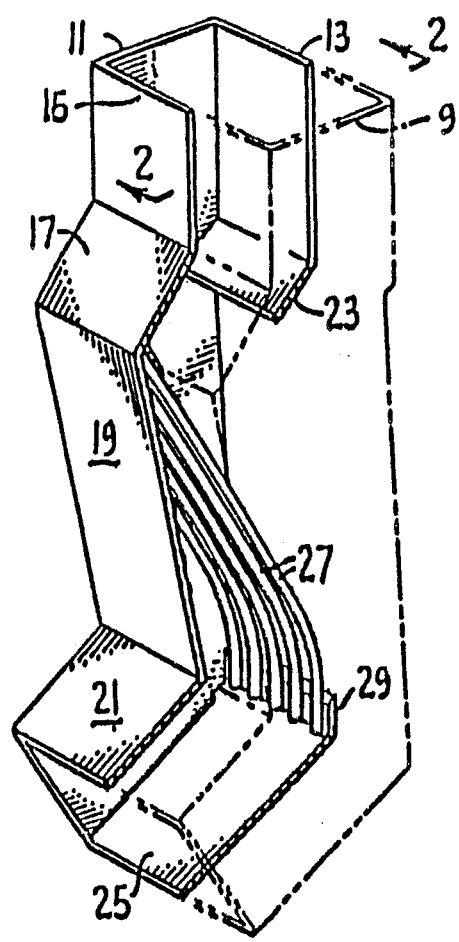
FIG. 1 is a perspective view of a device embodying the present invention, partly in section.
Figure 2:
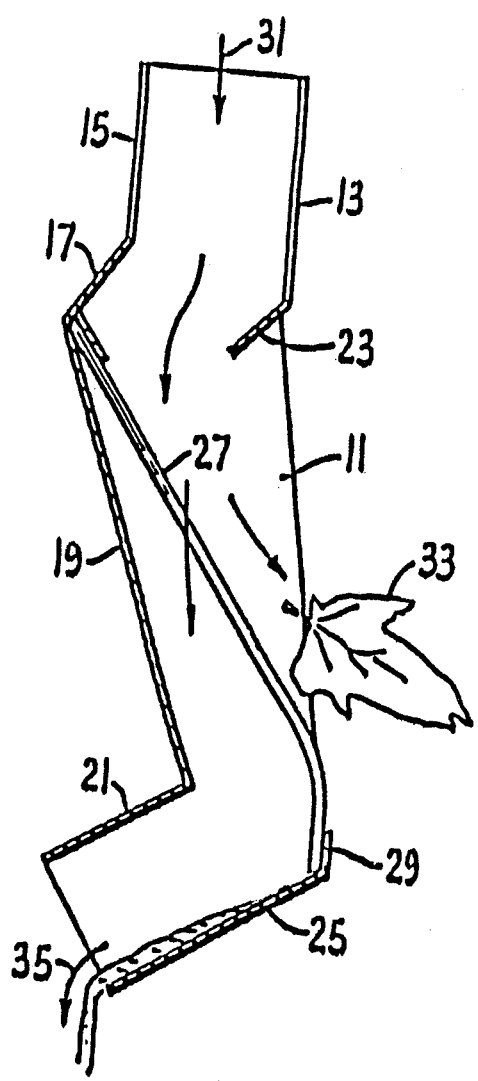
FIG. 2 is a side view on the line 2—2 of FIG. 1.
Figure 3:
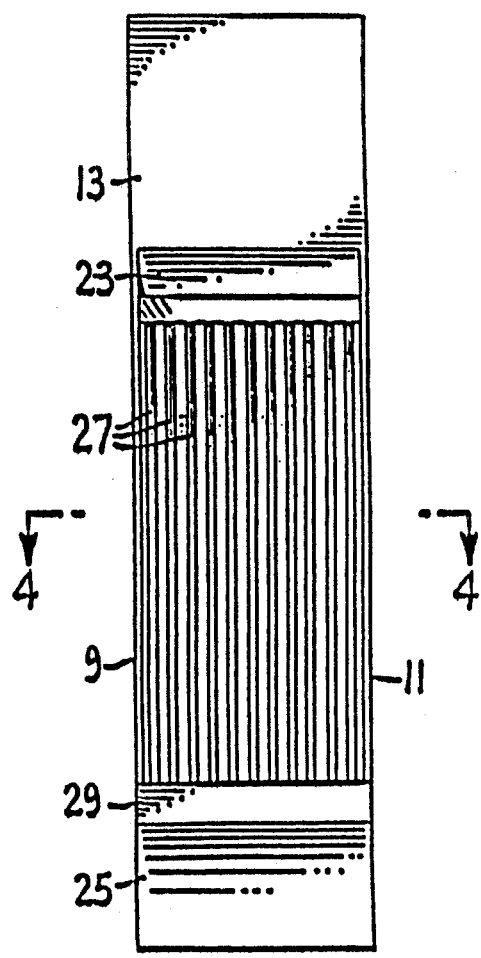
FIG. 3 is a front view of the open side of the separator unit.
Figure 4:
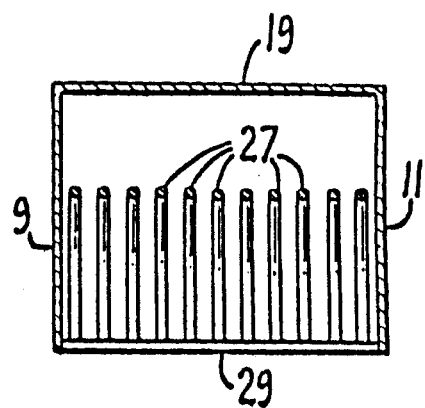
FIG. 4 is a section on the line 4—4 of FIG. 3.
Figure 5:
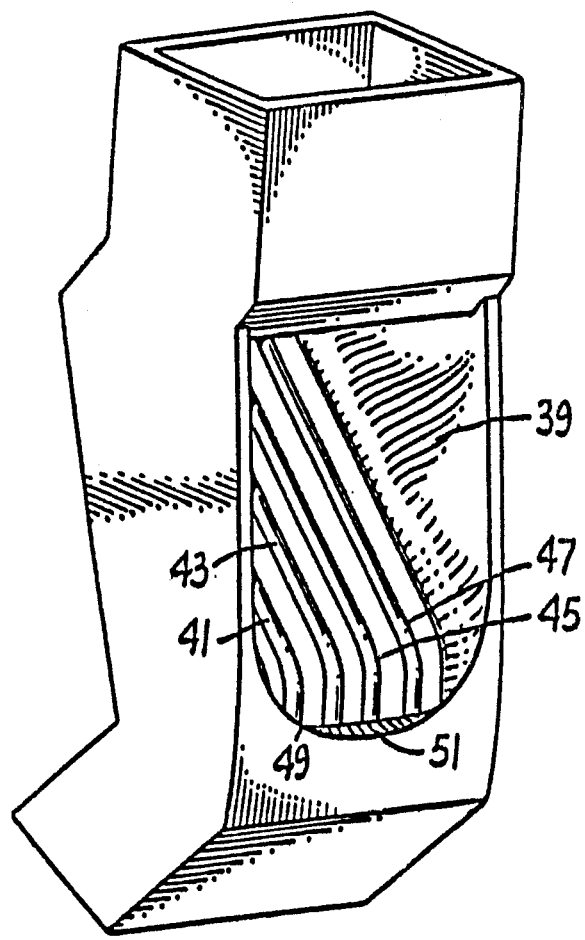
FIG. 5 is a perspective view of another embodiment of my invention.
Figure 6:
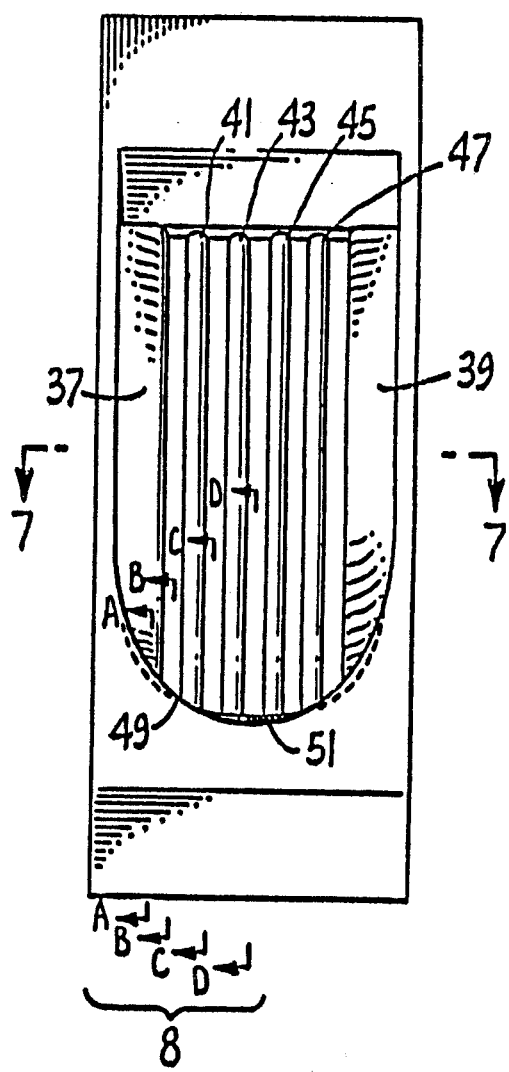
FIG. 6 is a front view of the embodiment shown in FIG. 5.
Figure 7:
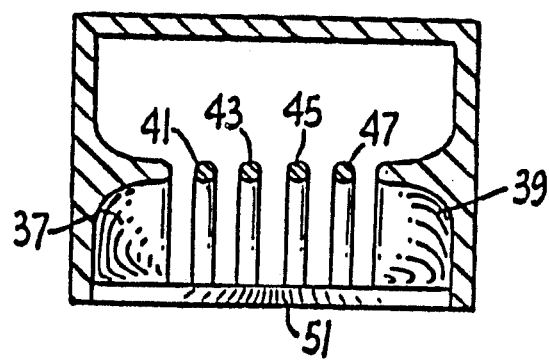
FIG. 7 is a section on the line 7—7 of FIG. 6.
Figure 8:
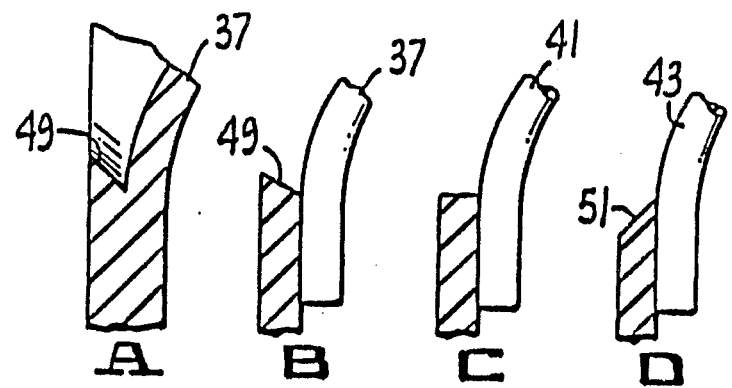
FIG. 8 are enlarged sectional views on the respective lines of AA; BB; CC and DD of FIG. 6.

The back wall 15, as is best seen in FIG. 2, has a vertical section near the top and angling section 17 to the rear, a second angling section 19 and terminates in a bottom section 21 which again angles to the rear. The front wall 13 is provided with an inwardly directed deflector 23 the purpose of which will be later explained. Below the deflector 23 is an open throat portion which extends from the deflector to a point just below the junction of the back walls 19 and 21. Below the open throat section is a section 25 which is opposite the section 21.

Disposed within the separator are s series of parallel bars 27 which extend from the junction of the sections 17 and 19 at the rear of the device at an acute angle downwardly and are joined to the top portion of the member 25 at the upstanding substantially vertical flange 29.

The angle of the back wall 29 is not particularly critical, it being only necessary that sufficient clearance be provided between the bars 27 and the back wall 19 so that water can flow freely down through the device. However, the location of the bars 27 is critical since they must form an acute angle with the vertical, preferably less than 30°. In operation, water flows down through the device, which water is normally contaminated with leaves and other debris. Water follows the path of the arrow 31 and the deflector 23 directs the debris containing water back against the bars 27. Since these bars are set at an acute angle to the vertical, there is a strong rushing flow of water through and along the bars so that leaves or the like are swept along and out of the device as is shown at 33. The water being freed of the debris now flows down the passage formed by the walls 21 and 25, as well as the side walls in the direction shown by the arrow 35. It will be seen that the angle of the grating 27 is very steep so that the water has a substantial velocity as it pases along the grating, sweeping any debris from the grating. Further, since the lower portion of the grating terminates in the upturned substantially vertical flange 29, there is no substantial tendency for the device to drip. Also, any debris tending to stand upon the grating is impacted upon and otherwise pressed upon by subsequent debris guided to the grating by the deflector, causing the standing debris to be forced downward along the bars to the region of their curvature to the substantially vertical, wherein the weight of the accumulated debris, plus the reduced contact area with the bars due to curvature, overcomes its tendency to adhere to the bars and the debris then falls away out of the system.

In the embodiment shown in FIGS. 5-8, curved side walls are used to lessen the possibility that any debris might cling to the side walls or wedge between the outside grating bar and sidewall surface, and not be washed free by the down flowing water. In this embodiment of the invention, the inner walls are sloped inwardly as is shown at 37 and 39 and the grating is formed of 4 bars designated 41, 43, 45 and 47. Of course, any number of bars might be employed. In this embodiment of the invention the lower lip is curved as at 49 and the bars terminate at the bottom edge on the member 51. In this way, maximum velocity of the water is assured since the incurved walls 37 and 39, coupled with the curved bottom opening 49 insure the maximum velocity of water so that even if the flow is slight, it will be directed to the center of the separator and still have substantial scrubbing ability to keep debris from clogging the device.

In addition, the inward slant of lip 49 in the zone described by FIGS. 8A and 8B directs residual water flow into the interior of the separator, thereby preventing dripping.

It will be seen that in this, as well as the embodiment of FIGS. 1-4, the lower terminal ends of the bars are substantially vertical. It has been found that in separators having straight bars, the debris tends to stick on the ends of the bars after the point where the water has been separated away. With the curved bars, however, at the point where the carrying water is mostly gone, the traveling debris encounters the curvature to the vertical, or near vertical, and the curvature itself, plus the vertical aspect of the bars tends to disengage the debris and prevent anything sticking at that point.

Although certain specific embodiments of the invention have been shown, it will be obvious to those skilled in the art that many variations can be made in the exact structure shown without departing from the spirit of this invention.

The subject matter to be claimed is:

1. A separation device for separating a down flowing stream of water containing debris, such as leaves, comprising in combination:
   a. a path for water generally downwardly through the separator,
   b. a grating interposed in said path, said grating comprising a plurality of roughly parallel bars, said bars being set at an acute angle of less than 30° to the vertical whereby water passing downwardly through said separator flows through said bars and debris contained in said water will be caught by said bars and separated from said downflowing stream of water and whereby said debris is caried downwardly along said grating and exteriorly of the separator through an opening in the separator, and
   c. the lower terminal end of each of said bars being bent to be substantially vertical.

2. A separation device for separating a down flowing stream of water containing debris, such as leaves, comprising in combination:
   a. a path for water generally downwardly through the separator,
   b. a grating interposed in said path, said grating comprising a plurality of roughly parallel bars, said bars being set at an acute angle of less than 30° to the vertical whereby water passing downwardly through said separator flows through said bars and debris contained in said water will be caught by said bars and separated from said downflowing stream of water, and whereby said debris is carried downwardly along said grating and exteriorly of the separator through an opening in the separator,
   c. the lower terminal end of each of said bars being bent to be substantially vertical, and
   d. including a lip formed adjacent the lower outer end of said bars to direct residual water away from said bars and into the interior of the separator.

* * * * *